United States Patent [19]

Thomas et al.

[11] Patent Number: 4,535,020
[45] Date of Patent: Aug. 13, 1985

[54] PERFORATED FILM

[75] Inventors: Paul E. Thomas; Garland E. Raley, both of Terre Haute, Ind.

[73] Assignee: Ethyl Corporation, Richmond, Va.

[21] Appl. No.: 569,405

[22] Filed: Jan. 9, 1984

Related U.S. Application Data

[62] Division of Ser. No. 401,939, Jul. 26, 1982, Pat. No. 4,456,570.

[51] Int. Cl.³ .......................... B32B 3/10; A61L 15/00
[52] U.S. Cl. .................................... 428/131; 428/133; 428/137; 604/383; 604/385 R; 128/156
[58] Field of Search ....................... 428/131, 134, 137; 264/22, 156, 300, 504; 604/366, 378, 383, 385; 128/156

[56] References Cited

U.S. PATENT DOCUMENTS

| | | | |
|---|---|---|---|
| 2,847,086 | 8/1958 | Müller | 428/137 |
| 3,384,696 | 5/1968 | Makansi | 428/131 |
| 3,471,597 | 10/1969 | Schirmer | 264/25 |
| 3,703,569 | 11/1972 | Wolkowicz | 264/22 |
| 3,719,736 | 3/1973 | Woodruff | 428/137 |
| 3,814,101 | 6/1974 | Kozak | 604/366 |
| 3,880,966 | 4/1975 | Zimmerman et al. | 264/22 |
| 3,881,489 | 5/1975 | Hartwell | 428/137 |
| 3,929,135 | 12/1975 | Thompson | 604/366 |
| 4,170,304 | 10/1979 | Hake | 264/22 |
| 4,323,069 | 4/1982 | Ahr et al. | 604/378 |
| 4,327,730 | 5/1982 | Sorenson | 604/385 R |
| 4,341,217 | 7/1982 | Ferguson et al. | 604/385 R |
| 4,353,799 | 10/1982 | Leonard | 264/22 |

Primary Examiner—Marion E. McCamish
Assistant Examiner—William M. Atkinson
Attorney, Agent, or Firm—Donald L. Johnson; John F. Sieberth; Paul H. Leondard

[57] ABSTRACT

A perforated thermoplastic film with less than ideally shaped tapered capillaries which has an increased liquid flow rate through the tapered capillaries and a method for making such a film. The method includes forming a perforated thermoplastic film having tapered capillaries from a resin into which an effective amount of a polarizable, migrating surfactant has been blended therewith and then treating the perforated thermoplastic film with a corona discharge treatment sufficient to increase the flow rate of liquid through said perforated film and provide a film having a percent run off of from about zero to ten percent.

The perforated film made in accordance with the invention has a much higher liquid transmission rate than similarly made non-surfactant treated perforated film having tapered capillaries which has been treated only with a corona discharge treatment. The latter may be conducted as the film is being formed and perforated.

14 Claims, 3 Drawing Figures

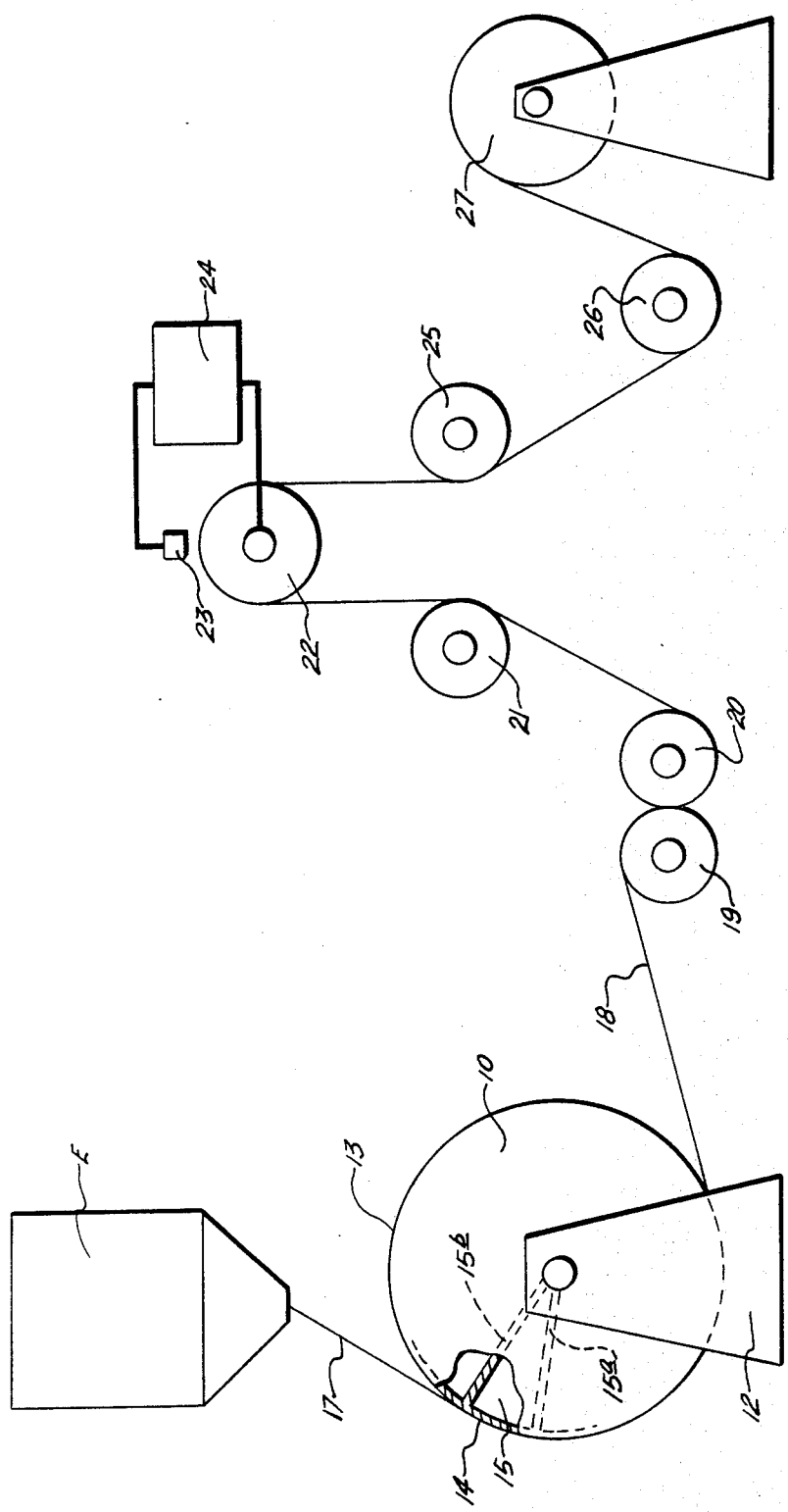
FIG. I.

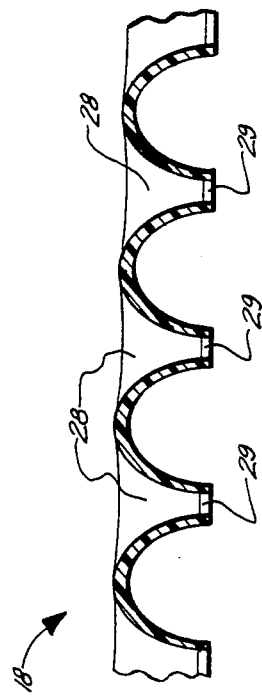
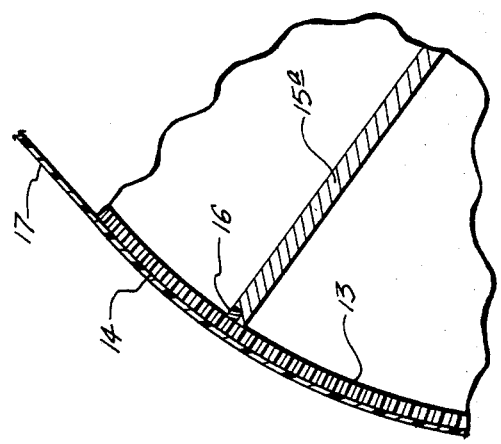

PERFORATED FILM

This application is a division of application Ser. No. 401,939, filed July 26, 1982, now U.S. Pat. No. 4,456,570.

BACKGROUND OF THE INVENTION

This invention relates to the manufacture of thermoplastic films. More particularly, this invention relates to thermoplastic films having minute perforations on a regularly arranged pattern over substantially the entire surface of the film which have increased liquid flow rates through their perforations and are useful in making sanitary and apparel structures or assemblies, and particularly for making infant and/or adult diapers.

Many thermoplastic films of different strengths, characteristics, colors, and dimensions are produced for a multitude of products. Perforated films have a multiplicity of regularly and/or randomly spaced apertures which allow permeation of liquid and air or other fluids. Such films can be used as a component of disposable composition garments for sanitary apparel purposes, such as napkins, diapers, or for hospital pads, bed or sleeping bag linings, and the like. In such composition structures, an exterior layer of film having the desired properties is provided which would be adjacent to the skin in a composite garment, and the garment would also include a filler layer or layers of absorbent fibrous material.

Surface treating of film for rendering the surfaces of the film more receptive to adhesives, paints, inks, lacquers, or to other surfaces in laminating processes is widely practiced throughout the plastic film industry. Various types of processes are utilized. Among these are corona discharge treatment, chemical treatment, flame treating, casing, electronic treating, plasma etching, ion plating and irradiation.

Chemical treatments include antistatic agents, additives which alter the polarity of the surface, adhesion promoters and other surface modifiers. A wide variety of additives for plasticizing, coloring, impact modification, slip, anti-fogging and stabilization may be added to the film forming resin prior to the film being made. Such chemical compounds may be added batchwise in powder mixers or to the feeding mix to compounders such as Banbury mixers or compounders.

A particular class of perforated film is described in Thompson, U.S. Pat. No. 3,929,135, issued Dec. 30, 1975. Thompson teaches an absorptive structure with a top layer of perforated film characterized by having a series of regular spaced small apertures in the form of tapered capillaries of certain dimension ranges. In the finished article, these are directed inwardly to be in intimate contact with an absorbent fibrous material layer. The smooth side of the perforated film is thus in use in contact with the skin. Film as described by Thompson, in a garment structure as outlined, maintains a dry and comfortable condition, even after transmission of fluids to the absorbent layer by the combined effects of the absorption and the resistance to back flow as a result of the relative length and surface properties of the tapered capillaries.

One method for making film with tapered capillaries on one side thereof is shown in U.S. Pat. No. 3,054,148, issued Sept. 18, 1961, to Zimmerli. In this patent heated film is supported by a perforated screen and a vacuum applied to the underside of the perforated screen. Holes are pulled in the film in the direction of the vacuum beneath the screen thereby forming tapered capillaries in the film.

An alternative technique for forming tapered capillaries is disclosed in U.S. Pat. No. 3,394,211, issued July 23, 1968, to McDuff. In the McDuff process the perforation technique comprises applying a blast of heated air to create a pressure differential across a perforated forming surface, conditions being appropriate to cause a rupture at a desired point.

Furthermore, film may be perforated by a variety of other means including mechanical perforation by pins or the like, and by electrical means such as corona discharge. U.S. Pat. No. 3,471,597 discloses a method for perforating a film by corona discharge and U.S. Pat. No. 3,880,966 discloses a method of increasing the permeability of a film with corona discharge. However, some, if not all, of such films do not have tapered capillaries.

Mito et al U.S. Pat. No. 2,763,759 discloses an apparatus for electrically perforating polymer sheet material or film. The film is first deformed with needles and then subjected to electrical discharge treatment to perforate the film.

U.S. Pat. No. 3,703,569 issued to Wolkowicz describes a corona treatment of a sheet polyethylene containing an antistatic agent, whereby the static decay rate of the sheet is increased.

Kozak, U.S. Pat. No. 3,814,101 discloses a type of perforated film having valvular openings or slits and a diaper incorporating such film.

Recently issued U.S. Pat. No. 4,283,291 to Lowther describes an apparatus for providing a corona discharge.

Canadian Pat. Nos. 766,213 and 790,038 to Adams et al and U.S. Pat. No. 3,018,189 to Traver disclose method and apparatus for corona discharge surface treatment of polyethylene film for improving the adhesion of dried ink impressions subsequently imprinted on the film. U.S. Pat. No. 3,754,117 to Walter discloses another type of apparatus and method for corona discharge treatment for modifying the surface properties of thin layers or fibers for similar adhesion improvement of inks or paints or of subsequent bonding.

U.S. Pat. No. 4,170,304 to Huke describes a method of manufacturing a polyethylene-polyisobutylene wrapping film employing a corona discharge surface treatment for improving the adhesive characteristic of the film.

Copending application Ser. No. 216,219 filed Dec. 15, 1980 now U.S. Pat. No. 4,351,784 discloses a corona discharge surface treatment of perforated thermoplastic film having tapered capillaries for increasing the flow of fluids through the film.

Thompson, supra, suggests that cell geometry, i.e. the specific shape of the tapered capillaries is the principal variable yielding good fluid flow rate or percent run off. Deviations from such critical shape will diminish the flow rate. While ideal dimensions may provide maximum flow rate, they are difficult to achieve economically in commercial operations.

Wetting agents such as soaps, detergents and surface-active agents are widely used in polymerization reactions and in preparing emulsions of plastic. Such compounds cause a liquid to penetrate more easily into or to spread over the surface of another material. Surface active agents or surfactants are compounds that alter the surface tension of a liquid in which they are dissolved.

Surface tension is the contractile surface force of a liquid by which it tends to assume a spherical form and to present the least possible surface. It may also be exerted at the junction of two liquids. It is generally measured in dynes per centimeter.

In general, to manufacture perforated polyethylene film having tapered capillaries of the critical dimensions welded cylinder screens are used. Such screens are expensive and have a relatively short life span. Replacing the screens with less expensive and longer lasting non-welded screens results in a product having a somewhat different cross-sectional geometry than desired and a higher percent run off.

Film produced on welded screens has substantially the desired cell geometry and normally has a zero or near zero percent run off. Film produced on non-welded screens has a less desirable cell geometry and as much as 10 percent run off only after the film is heavily treated with corona discharge. This difference in percent run off is the difference between a highly marketable product and an undesirable one.

It has been discovered that by combining a chemical surface treatment wherein a surfactant is added or blended with the resin, with a corona discharge treatment a perforated polyethylene film having a zero or near zero percent run off can be produced on the less expensive non-welded screens.

It is therefore an important object of the present invention to provide a relatively economical means of producing a perforated film having zero percent run off.

It is an object of the present invention to increase the flow of liquids through a perforated film having tapered capillaries of less than ideal dimensions or cell geometry.

Other objects and advantages of the invention will become more readily apparent from a consideration of the description and drawings hereinafter.

SUMMARY OF THE INVENTION

In accordance with the present invention there is provided a perforated thermoplastic film with tapered capillaries which has a run off percent of less than about 10 percent and which has an increased liquid flow rate through the tapered capillaries and a method for making such a film. The method includes a two-fold surface treatment. One surface treatment is provided by adding an internal chemical additive, namely a surfactant, to a film forming polyolefin resin. The additive is compounded or otherwise mixed or blended with the resin prior to the film being formed from the resin. After the film is formed the other surface treatment is accomplished by treating the film with a corona discharge treatment which acts on the chemical additive to provide the perforated film with a zero or near zero percent run off.

Less expensive non-welded screens may be used which result in a perforated film having tapered capillaries with a cell geometry or shape less than ideal.

The film made in accordance with the invention has a much higher liquid transmission rate than similar perforated film having tapered capillaries without the chemical additive and which have been treated only with a corona discharge treatment. The latter may be employed continuously as the film is being formed and perforated.

BRIEF DESCRIPTION OF THE DRAWINGS

FIG. 1 is a schematic elevational view showing the inter-relationship of the principal pieces of equipment employed in carrying out the process;

FIG. 2 is an enlarged, sectional view showing a segment of the forming surface as employed in the process; and, FIG. 3 is an enlarged, schematic, sectional view of a type of perforated film having less than ideally shaped tapered capillaries.

DESCRIPTION OF THE PREFERRED EMBODIMENTS

A small amount of a surface active agent or surfactant is compounded into polyolefin resin pellets, preferably polyethylene resin pellets, from which the film is to be made. The surfactant or chemical additive exudes to the film surface during the following extrusion. Such exudation is due to the insolubility of the additive in the polyolefin at normal temperatures. During extrusion, the molten amorphous mass is quenched to a semi-crystalline web. As ordered crystalline structure form, the amorphous volume decreases. Since the additive molecules are incompatible in the crystalline structure and insoluble in the cooling amorphous region, they are squeezed or caused to migrate to the surface of the polyolefin.

The surfactant provides a film surface which has greater polarizability than the polyolefin film would have without the surfactant being added. Higher surface polarity yields higher wettability. Although the chemically treated film is more polar than untreated film, corona discharge treatment of the film itself provides the desired maximum wettability. Any surfactant which achieves this polarity and which migrates to the surface of the film may be used in this invention. Excellent success has been achieved using a product known commercially as ATMUL 84 and identified by the manufacturer as being mono- and diglycerides and containing a minimum of about 40 percent by weight of alpha monoglyceride with a maximum content of one percent by weight of each, water, free fatty acid, and free glycerine. The amount of the surfactant added should be an amount sufficient to render the desired percent run off of the manufactured film after corona discharge treatment. Excellent results have been achieved using about five percent by weight of said monoglyceride product.

Referring to FIG. 1, an apparatus for carrying out the process of the invention includes a rotary cylindrical drum 10 supported at each end by a centrally disposed axle 11 supported by means of stationary axle supports 12. The cylindrical surface 13 of drum roll 10 is highly perforated to allow air to pass therethrough. The molding element or screen 14 is mounted around the surface 13 of drum 10 and is adapted to rotate with the drum 10. The screen 14 may be a welded cylinder screen or a less expensive non-welded one. The present invention is especially suitable for use with the latter type screen. The invention may be practiced with the former but no special benefit may be derived when so practiced.

Element 14 may be formed as an integral unit adapted to be slipped on drum 10 from an end thereof or it may be wrapped around the drum 10 and then secured thereto in any suitable manner. For purposes of rotating drum 10, a gear drive may be employed which is adapted to mesh with gearing provided on the drum element itself or a pulley drive may be connected to the drum by means of caps provided on the ends thereof. As shown in FIG. 1, a vacuum chamber 15 is utilized to create a pressure differential between the respective surfaces of the thermoplastic sheet to cause the plasticized sheet to flow into the perforations provided in the molding element 14 and therefore perforate the sheet.

Referring to FIGS. 1 and 2, the vacuum chamber 15 is positioned within drum 10, along the axis of drum 10 and opens at the surface of the drum over a limited portion of its periphery in contact with the inner portion of surface 13 of drum 10. Two plates 15a and 15b define the chamber. In order to provide an effective seal of the leading and trailing edges of chamber 15, seals 16 are provided in plates 15a and 15b to form a seal against the surface 13. The seals may be made of rubber or other suitable material. The plates 15a and 15b are stationary and rigidly affixed to axle 11 or other suitable means so that chamber 15 remains in a fixed or stationary position in drum 10. Thus, chamber 15 is sealed at all points except the peripheral openings on drum 10 and may be evacuated or reduced in pressure by pumping equipment connected to the chamber in any suitable manner.

As can be seen in FIG. 1, located above and adjacent to drum 10 is extruder E which is used to extrude a hot thermoplastic sheet 17 onto drum 10 made from the chemically treated resin. As the sheet material 17 travels downwardly from extruder E, the sheet contacts screen 14 which is turning counter-clockwise with drum 10 in FIGS. 1 and 2. The rotating screen 14 carries sheet 17 over vacuum slot 15 which causes the thermoplastic material to be drawn into the openings in screen 14 and thereby perforated. The sheet 17 continues to travel around in a counter-clockwise manner shown in FIG. 1 on drum 10 and continues on to the rolls 19 and 20.

From roll 20 the sheet material 18 continues upwardly over roll 21 to corona treating roll 22. The corona treating roll 22 is usually covered with a suitable dielectric material such as epoxy, fluorinated polyethylene (TEFLON), chlorinated polyethylene (HYPALON), or polyester (MYLAR). The electrode or corona bar 23 is suspended parallel to the treater roll at about 1/16 of an inch above the roll. The corona bar 23 is energized by a transformer and corona treating power source 24. The sheet continues past a tension roll 25 to a second tension roll 26 and onto wind-up roll 27.

As can be seen in FIG. 3, the tapered capillaries 28 of the film have a hole 29 in the bottom thereof for release of liquids or fluids. The top or smooth side of the film is referred to as the female side and the bottom side of the film is referred to as the male side. The side walls in the preferred embodiment in FIG. 3 are shown to be curved, but they could be straight so that the capillaries would be conical.

In the following examples, film was first prepared in the "untreated" state by preparing the film on the apparatus disclosed in FIG. 1 with the exception that there was no surfactant additive to the resin or no corona treatment of the film. When the film was prepared on the apparatus of FIG. 1 and treated, the film is referred to as either surfactant treated, corona treated or treated with both surfactant additive and corona discharge treatment.

In the surfactant treated samples, five percent by weight of ATMUL ® 84, a well known commercial antistat concentrate, was added to a standard polyethylene film forming resin and compounded therewith.

The corona treatment unit utilized in the above examples was a Pillar solid state corona treater having a 460 volt, 60 cycle, 3 phase input power supply with a power output of 12 KVA at 9.6 kilohertz. Both the treated and untreated films were tested for "run off". The run off test comprised running a known volume of test solution down a portion of the perforated film held at a 10 degrees incline. The amount of solution not absorbed through the capillaries of the perforated film was measured and percent run off was calculated. Percent run off is defined as the percent of the original volume of test solution not absorbed. Therefore, the lower percent run off, the higher the rate of absorption.

The test solution contained the following ingredients by weight percent:

98.975 weight percent distilled water;

1.00 percent sodium chloride; and, 0.025 percent alkylaryl polyether alcohol bearing the trade name "Triton X-100" and manufactured by the Rohm & Haas Company.

An 11 inch by 5½ inch rectangular sample was cut from each sheet of perforated film tested. The test film was laid over an absorbent material common to disposable diapers then mounted in a stand at a 10 degrees incline, i. e., 10° above the horizontal. Twenty-five milliliters of the test solution was then poured over the sample and the amounts which ran off of the sample and were not absorbed inside of the perforations in the sample was measured.

The percentage run off is much lower in film that had been both surfactant treated and corona discharge treated than in film which was untreated or which had only been corona discharge treated or only surfactant treated. This improvement is especially significant in such applications as childrens' or adults' diapers where maximum liquid absorption is the goal and the desirable percent run off is zero.

The results are tabulated as follows:

|  | Percent Run Off |
| --- | --- |
| Untreated film | 60 |
| Surfactant treated only film | 50 |
| Corona discharge treated only film | 40 |
| Both surfactant treated and corona discharge treated film | 0 |

A wide variety of surfactants or surface active agents may be added to the polyolefin resin, mixed or blended therewith, in amounts of up to about 10 percent by weight. Smaller amounts are preferable and larger amounts may be used, but amounts should not be so great as to unduly lessen the quality of the film made from the resin. Any suitable surfactant may be used, but it should be one which is polarizable and which is migratory to the surface of the film. For convenience, the surfactant is identified as a polarizable migrating surfactant.

Included among such surfactants are compounds collectively referred to as antistatic agents, antifog agents and wetting agents. Antistatic agents normally consist of nitrogen compounds such as long chain amines, ethoxylated long chain aliphatic amines, long chain amines or quaternary ammonium salts, e.g., stearamido-propyldimethyl-2-hydroxyethyl ammonium nitrate; sulphonic acids and alkyl aryl sulphonates; phosphate esters; polyhydric alcohols and derivatives; phosphoric acid derivatives, e.g. didodecyl hydrogen phosphates; polyethylene glycols, polyethylene glycol derivatives, e.g. hexadecyl ether or polyethylene glycol and polyethylene glycol esters.

Typical antifog agents include alkylphenol ethoxylates, polyol mono-esters, polyoxyethylene esters of oleic acid, polyoxyethylene sorbitan esters of oleic acid and sorbitan esters of fatty acids.

The voltage and length of time of the corona treatment can vary according to the type of film being utilized. Composition of the film, the speed of the film through the treating units, and thickness of the film can be varied to achieve the particular decrease in run off which is described as a result of the treatment.

Preferably, the film prepared in accordance with the present invention has run off by volume of from 0 percent to less than 10 percent. The most preferred film prepared in accordance with the present invention has a percentage run off of from 0 percent to 5 percent.

Any thermoplastic material which may be formed into flexible film or sheets may be used in the production of the novel products of the present invention. Exemplary thermoplastic materials include cellulose esters, e.g., cellulose acetate, cellulose propionate, cellulose butyrate; mixed esters of cellulose; cellulose ethers, e.g., ethyl cellulose; nylon and polymeric materials, e.g., polyvinyl alcohol acetals, polyvinyl chloride, polyvinyl chloride acetate, polystyral, methyl methacrylate, polyethylene, polypropylene, and other polyolefins which may be formed into flexible film or sheet, and the like. Particularly preferred perforated films are polyethylene and polypropylene. The film may be a low density polyethylene. Sheets or film made from such materials may be plasticized with suitable plasticizers and other additives known in the art may be added to achieve the desired physical characteristics.

Although the preferred embodiments of the present invention have been disclosed and described in detail above, it should be understood that the invention is in no sense limited thereby and its scope is to be determined by that of the claims hereinafter.

The foregoing disclosure and description of the invention is illustrative and explanatory thereof and various changes in the illustrated process and product may be made within the scope of the appended claims without departing from the spirit of the inventions.

What is claimed is:

1. A thermoplastic film forming resin in the form of a perforated, self-supporting sheet characterized in that,
   (a) said self-supporting sheet containing along with the resin a sufficient amount up to about ten percent by weight based on the weight of the resin of a polarizable migrating surfactant to provide the self-supporting sheet with a runoff of less than about ten percent;
   (b) said self-supporting sheet having perforations that are tapered capillaries;
   (c) said self-supporting sheet having been treated with a corona discharge; and
   (d) said corona discharge treated surface of said self-supporting sheet having a run off of less than ten percent.

2. The perforated, self-supporting sheet of claim 1, wherein said polarizable migrating surfactant is a glyceride surfactant.

3. The perforated, self-supporting sheet of claim 1, wherein said tapered capillaries have outwardly curved side walls.

4. The perforated, self-supporting sheet of claim 1, wherein said film forming resin is a polyolefin.

5. The perforated, self-supporting sheet of claim 1, wherein said film forming resin is a polyethylene.

6. The perforated, self-supporting sheet of claim 1, wherein said film forming resin is a polypropylene.

7. A perforated thermoplastic resin film having a multiplicity of apertures in the form of tapered capillaries, said film containing a sufficient amount of a polymerizable migrating surfactant up to about ten percent by weight of the film forming resin from which the film is constructed to render a run-off of said film of less than about ten percent after corona discharge treatment, at least one surface of said film having been subjected to a corona discharge treatment, and said film having a percent runoff from zero percent to less than about ten percent.

8. The perforated thermoplastic film of claim 7, wherein the film is a polyolefin film.

9. The perforated thermoplastic film of claim 7, wherein the film is a polyethylene film.

10. The perforated thermoplastic film of claim 7, wherein the film is a polypropylene film.

11. The perforated thermoplastic film of claim 7, wherein the tapered capillaries have outwardly curved side walls.

12. The perforated thermoplastic film of claim 7, wherein the polarizable migrating surfactant is an antistatic agent or an antifog agent.

13. The perforated thermoplastic film of claim 7, wherein the film has a runoff of from zero percent to about five percent.

14. A perforated thermoplastic resin film having a multiplicity of apertures in the form of tapered capillaries, said film containing a sufficient amount of a polarizable migrating glycride surfactant up to about ten percent by weight of the film forming resin from which the film is constructed to render a runoff of said film of less than about ten percent after corona discharge treatment, said film having been subjected to a corona discharge treatment, and said film having a percent runoff from zero percent to less than about ten percent.

* * * * *